United States Patent [19]
Schmitz et al.

[11] Patent Number: 5,684,756
[45] Date of Patent: Nov. 4, 1997

[54] NOISE REDUCING SCREEN DEVICES FOR IN-FLOW PRESSURE SENSORS

[75] Inventors: Fredric Schmitz, Palo Alto; Sandy Liu, Cupertino; Stephen Jaeger, Sunnyvale; W. Clifton Horne, San Jose, all of Calif.

[73] Assignee: The United States of America as represented by the Administrator of the National Aeronautics and Space Administration, Washington, D.C.

[21] Appl. No.: 589,671

[22] Filed: Jan. 22, 1996

[51] Int. Cl.⁶ .................................................. H04R 1/02
[52] U.S. Cl. ................................................... 367/188
[58] Field of Search .................................. 367/188, 173, 367/165, 132, 140; 381/154, 169, 188, 189, 205

[56] References Cited

U.S. PATENT DOCUMENTS

| | | | |
|---|---|---|---|
| 1,345,717 | 7/1920 | Thomas | 367/149 |
| 4,123,622 | 10/1978 | MacLeod | 367/132 |
| 4,463,453 | 7/1984 | Cohen et al. | 367/140 |
| 4,637,489 | 1/1987 | Iwanaka et al. | 381/91 |
| 4,768,614 | 9/1988 | Case | 181/158 |
| 4,770,032 | 9/1988 | Plentovich et al. | 73/147 |
| 4,772,764 | 9/1988 | Dorr | 367/117 |
| 4,796,726 | 1/1989 | Kobayashi et al. | 367/140 |
| 4,975,966 | 12/1990 | Sapiejewski | 181/158 |
| 5,099,220 | 3/1992 | Camarota | 116/26 |
| 5,136,881 | 8/1992 | Kendall, Jr. | 73/147 |
| 5,168,525 | 12/1992 | Müller | 381/91 |
| 5,288,955 | 2/1994 | Staple et al. | 181/158 |
| 5,339,287 | 8/1994 | Bauer | 367/140 |
| 5,412,162 | 5/1995 | Kindel | 181/150 |

*Primary Examiner*—Daniel T. Pihulic
*Attorney, Agent, or Firm*—Kenneth L. Warsh; John G. Mannix; Harry Lupuloff

[57] ABSTRACT

An acoustic sensor assembly is provided for sensing acoustic signals in a moving fluid such as high speed fluid stream. The assembly includes one or more acoustic sensors and a porous, acoustically transparent screen supported between the moving fluid stream and the sensor and having a major surface disposed so as to be tangent to the moving fluid. A layer of reduced velocity fluid separating the sensor from the porous screen. This reduced velocity fluid can comprise substantially still air. A foam filler material attenuates acoustic signals arriving at the assembly from other than a predetermined range of incident angles.

20 Claims, 2 Drawing Sheets

NOISE REDUCING SCREEN DEVICES FOR IN-FLOW PRESSURE SENSORS

ORIGIN OF THE INVENTION

The invention described herein was made by and employee(s) of the United States Government and may be manufactured and used by or for the Government for governmental purposes without payment of any royalties thereon or therefore.

BACKGROUND OF THE INVENTION a. Technical Field of the Invention

The present invention relates to noise reduction devices for pressure sensors such as microphones and the like.

b. Description of the Prior Art

Numerous devices have been developed for reducing the wind or flow noise on individual microphones or other pressure sensors. For example, in order to reduce low speed wind noise, a cloth or compliant foam sphere has been placed over a microphone to be protected. For sound measurements in high speed flows, a conical noise cone in combination with a porous screen can be used to reduce the noise, so long as the axis of the microphone is in alignment with wind direction. The pressure sensing element can also be mounted flush with the surface of a flat or curved plate which is exposed to the flow stream.

These prior art approaches suffer a number of disadvantages. For example, the streamlined nose cone with a porous screen is suitable only for individual microphones which must be carefully aligned axially with an aerodynamically designed support strut, and is expensive and otherwise impractical for many sensor applications. The flush mounted arrangement exposes the sensor to damaging contact with dust and other particles, as well as to pressure disturbances inherent where the mounting surface is also exposed to the flow. In addition to these disadvantages, all of these arrangements expose the sensor or sensors to acoustic signals arriving from many directions.

Patents of interest in this field include the following: U.S. Pat. No. 4,463,453 (Cohen et al.); U.S. Pat. No. 4,637,489 (Iwanaka et al.); U.S. Pat. No. 4,768,614 (Case); U.S. Pat. No. 4,770,032 (Plentovich); U.S. Pat. No. 4,796,726 (Kobayashi et al.); U.S. Pat. No. (4,975,966) Sapiejewski; U.S. Pat. No. 5,136,881 (Kendall, Jr.); U.S. Pat. No. 5,168,525 (Muller); U.S. Pat. No. 5,288,955 (Staple et al.); U.S. Pat. No. 5,339,287 (Bauer).

Briefly considering these patents, the Cohen et al patent discloses a dual microphone arrangement for sonic detection in a flow field wherein the axis of the microphone pairs is perpendicular to the flow field and a noise shield, in combination with sound absorbers, minimizes incident and reflected noise. The Iwanaka et al patent discloses an electroacoustic transducer including air chambers. The Case patent discloses a unidirectional enhancer for microphones including an enclosure with acoustic dampening material therein and forming a horn having an entrance opening at which a microphone element is disposed. The Plentovich et al patent, a NASA patent, discloses a porous plug for reducing orifice induced pressure error in static pressure measurements of airfoil in wind tunnel testing. The Kobayashi et al patent discloses an ultrasonic rangefinder wherein a transmitter and receiver are housed in a recessed block and conic elements are used to direct and select sounds. The Sapiejewski patent discloses an arrangement for reducing microphone "puff" noise including a protective grid covering an end of a housing and a spacer layer between the grid and a microphone capsule. The Kendall, Jr. patent, a NASA patent, discloses an apparatus for the measurement of waves in flows across a surface, wherein microphones are recessed in a cavity and arranged perpendicular to the flow. The Muller patent discloses a boundary layer microphone comprising an electroacoustic transducer with a membrane mounted within the sound reflecting surface of a mounting plate. The Staple et al. patent discloses wind noise and vibrating noise reducing microphone wherein the microphone is located within a shield in the vortex of an eddy current downstream from the wind direction. The Bauer patent discloses an airborne acoustic sensor wherein a noise cone structure houses a microphone in communication with the surface through radial passages.

SUMMARY OF THE INVENTION

In accordance with the invention, a pressure sensor assembly is provided which reduces the levels of interfering noise which result from placing individual or multiple pressure sensors in a high velocity fluid (gas or liquid) stream, while preserving the desired sensitivity of such sensors to propogating acoustic signals. The sensor assembly of the invention also has controlled sensitivity to acoustic signals arriving from certain specific selected directions while attenuating signals from other directions in accordance with a predetermined directional response.

The invention has wide commercial application including the fields of aerospace, ground transportation, manufacturing, piping or conduit delivery systems, sonar ranging and the like. The invention can effectively measure sound in a wind stream or from any vehicle moving through air or water including the detection of external sounds from inside of a sound-proofed automobile. The invention represents a significant improvement in basic acoustics measurement technology and can be used to improve or replace existing commercial microphone noise reduction devices.

According to the invention, an acoustic sensor assembly is provided for sensing acoustic signals in a moving fluid such as high speed fluid stream, the assembly comprising: at least one acoustic sensor; and a porous, acoustically transparent screen supported between the high speed fluid stream and the at least one sensor and having a major surface disposed so as to be tangent to the high speed fluid stream. A further important aspect of the invention concerns the provision of a layer of reduced velocity fluid separating the at least one sensor from the porous screen. In one implementation, the reduced velocity fluid comprises substantially still air.

In one preferred embodiment, the screen is supported in a wall and the at least one sensor is mounted within the wall. In another preferred embodiment, the screen is supported in a streamlined structure which protrudes into the high speed fluid stream.

In accordance with a further important aspect of the invention, there is provided means for attenuating acoustic signals arriving at the assembly from other than a predetermined range of incident angles. Preferably, a space is defined between the porous screen and the at least one sensor, and the attenuating means comprises a sound absorbing material disposed in the space and including an aperture therein positioned over the at least one sensor and extending between the at least one aperture and the porous screen.

As compared with prior art devices, the sensor assembly of the invention exhibits greatly reduced response to interfering surface generated noise, while retaining a full, or selectively directional, response to incident acoustic waves. Further, the protective porous screen and the reduced velocity air serve to protect fragile sensors. An additional advantage over intrusive sensors of the prior art is that the sensor region can be made to conform with existing boundary surface contours, with reduced drag and noise as compared with that introduced by sensor supports which protrude into the flow.

Other features and advantages of the invention will be set forth in, or apparent from, the following detailed description of preferred embodiments of the invention.

DESCRIPTION OF THE PREFERRED EMBODIMENTS

Figure 1:
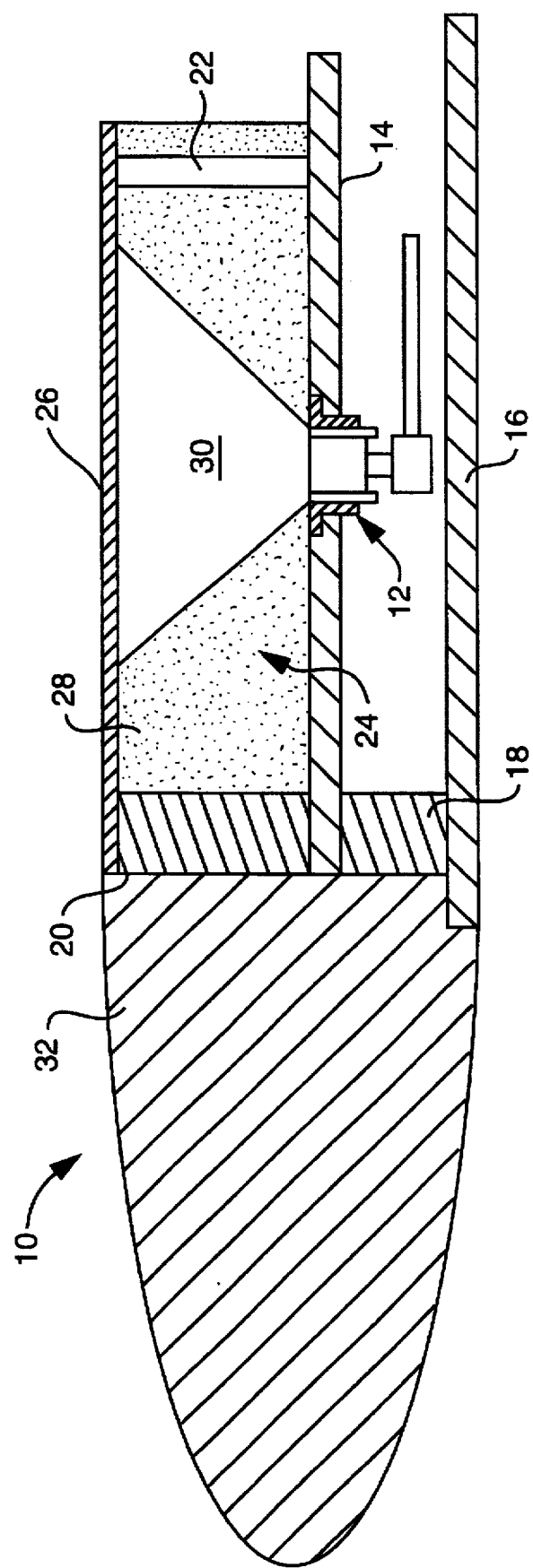
FIG. 1 is a longitudinal cross sectional view of an acoustic sensor assembly in accordance with one embodiment of the invention.

Referring to FIG. 1, a transverse cross sectional view of a first preferred embodiment of the invention is shown. In this embodiment, the sensor assembly, which is generally denoted 10, is mounted in a high speed stream and includes a conventional sensor device or sensor 12 mounted in a conventional sensor support plate 14, above a backing plate 16. Although only a single sensor 12 is shown, it will be appreciated that a plurality of sensors arranged in spaced relation can be employed. The plates 14 and 16 are separated by spacer members or walls, one of which, denoted 18, is shown in FIG. 1.

An upper wall 20 and a spacer element 22 create a cavity 24 above sensor 12. Cavity 24, and thus sensor 12, are covered by a screen 26. Screen 26 is a porous acoustically transparent screen and is disposed or suspended so that the surface thereof is tangent to the high speed stream. In an exemplary implementation, screen 26 comprises a 16 gage 68% porous plate covered with 10 cgs Rayl screen. Cavity 24 houses a layer of still or reduced velocity fluid (gas or liquid) which is air in the embodiment shown in FIG. 1 and which separates sensor 12 from screen 26.

In the illustrated embodiment, a sound absorbing (e.g., foam) filler member 28 with a conical cut-out or aperture 30 is located within cavity 24 to control the directional response of sensor 12. Conical cut-out 30 overlies sensor 12 and tapers down from a relatively large diameter at the screen 26 to a diameter at the sensor 12 corresponding to that of the active sensing area of the sensor 12.

A streamlined fairing 32 extending in the direction of flow is provided for smooth control of flow over the sensor region.

Figure 2:
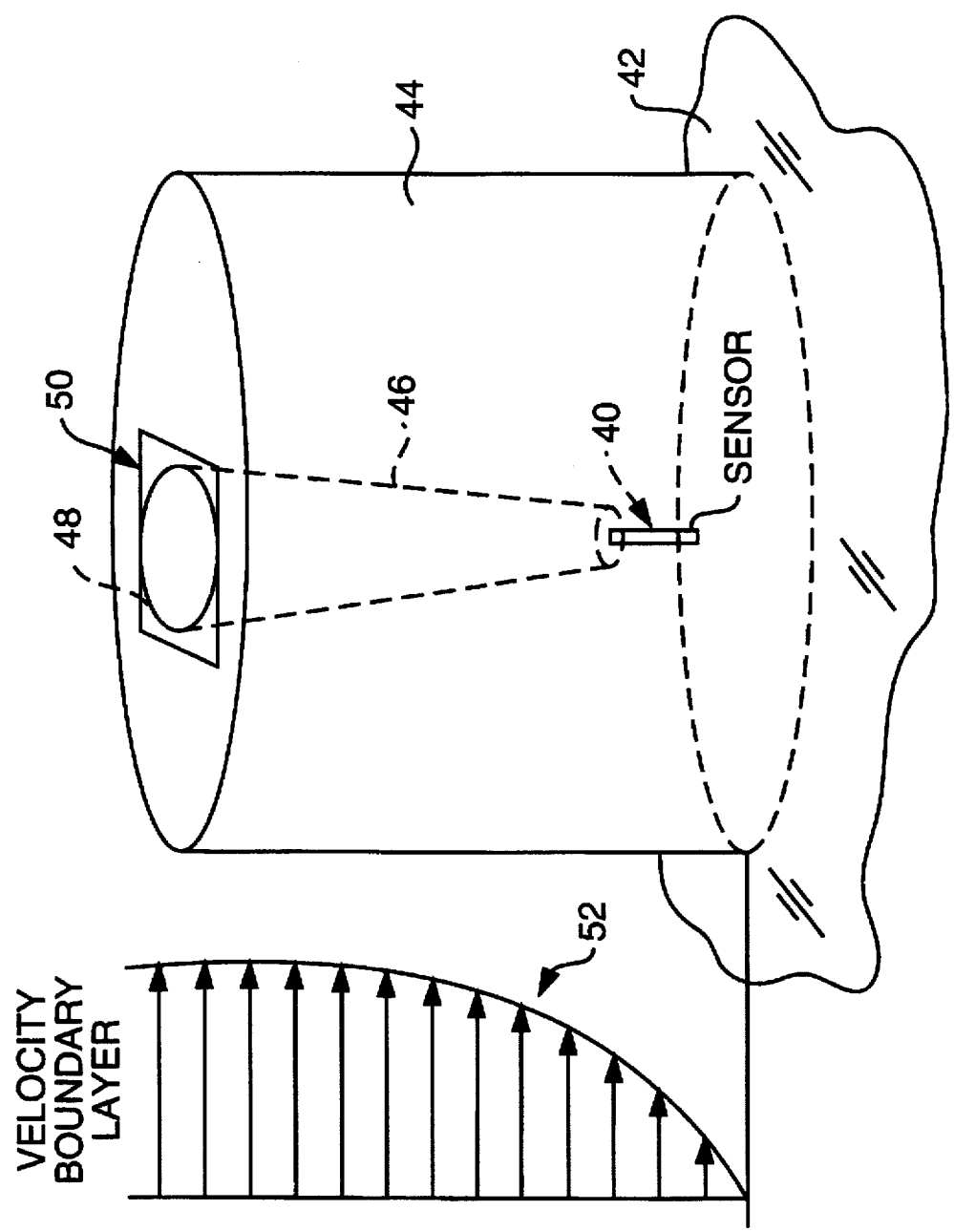
FIG. 2 is a schematic perspective view of a second embodiment of the acoustic sensor assembly of the invention.

Referring to FIG. 2, a second preferred embodiment of the invention is shown which illustrates an application wherein the sensor mounting arrangement protrudes into the high speed stream beyond a wall boundary layer or free shear layer. In the embodiment illustrated, a sensor 40 is mounted within, i.e., recessed in, a streamlined fairing member 44 affixed to a wall surface indicated at 42. A conical channel or aperture 46 is provided between sensor 40 and the top surface of fairing member 44. It is favorable that the fairing member 44 be aerodynamically streamlined to minimize turbulent flow over screen/sensor region 50. The opening 48 at the top of channel 46 is covered by a porous screen cover 50. Again, screen cover 50 is a porous, acoustically transparent screen and a layer of still or reduced velocity fluid, e.g., air, is provided between sensor 40 and screen 50.

The velocity boundary layer is indicated at 52 in the left hand portion of FIG. 2, and it will be seen that the streamlined fairing member 44 with porous screen cover 50 and recessed sensor 40 serve to position the sensor port outside of the wall turbulent boundary layer.

It will be understood that any surface, when exposed to liquid or gaseous flow, will generate flow disturbances at the surface which convect in the flow direction at some fraction (typically one-half) of the flow velocity, and that acoustic sensors placed at this surface will respond to these interfering disturbances as well as the incipient acoustic waves which the sensors are designed to detect. Significant noise reduction is provided by the invention by placing the sensor (s) (corresponding to sensors 12 and 40) behind the corresponding porous screen (26 or 50). Further, the porous screen also acts to prevent damage through impact and erosion. The screen also protects the sensor(s) from contact with superheated, supercoated, or corrosive gases and liquids. Additional significant noise reduction is provided by recessing the sensor(s) (12 and 40) from the porous screen (26 or 50) so that a layer of still or reduced velocity gas or liquid between the sensors and the porous screen.

It is noted that in the case of two-dimensional disturbances which are aligned along the surface of the screen and oriented normal to the direction of flow, the situation is analogous to the motion of air past a wall with a wavy surface. Invisced theory predicts that for subsonic motion (Mach number less than 0.5), the pressure disturbances should decay as:

$$10 \log (P_n{}^\wedge 2) = K - 4.3*(4*\pi*f*y/U_c)$$

where:

$P_n$ is the surface noise pressure amplitude,

K is the amplitude of the pressure disturbance at the surface, f is the disturbance frequency measured by a stationary sensor, y is the distance separating the sensor from the porous screen, and $U_c$ is the convection speed of disturbances at the surface of the porous screen.

Thus, the predicted noise attenuation with frequency will vary for different separation distances y in accordance with the above formula.

The device of the invention also has the property that interfering acoustical disturbances arriving from directly downstream or upstream of the sensor 12 or 40 can be rejected through the mechanism of reflection at the shear layer formed at the surfaces of the porous screen 26 or 50. If sensitivity to acoustical signals is desired, this response can be achieved by mounting the sensor or sensors directly behind the porous screen or in a position recessed only a small distance from the screen which reduces the grazing incidence angle.

As illustrated above by, e.g., foam filler member 28 with conical aperture 30 therein, the directional response of each sensor can be tailored by placing sound absorbing material, such as foam, with the space between the screen and sensor(s), with open aperture(s) positioned over the sensor (s). It will be understood that the apertures can be shaped as desired to transmit only acoustic signals arriving at the sensors from a predetermined range of incident angles as discussed above.

It will be appreciated from the foregoing that the sensor assembly or arrangement of the invention is applicable to sensors which are installed in an enclosure, the liner skin of a wind tunnel or other conduit, or on the surface of a flight, ground, or underwater vehicle, or in conjunction with any fixed object exposed to a moving stream of fluid (gas or liquid).

Although the present invention has been described relative to specific exemplary embodiments thereof, it will be understood by those skilled in the art that variations and modifications can be effected in these exemplary embodiments without departing from the scope and spirit of the invention.

What is claimed is:

1. An acoustic sensor assembly for sensing acoustic signals in a moving fluid stream, said assembly comprising:

a housing at least one acoustic pressure sensor located within said housing for sensing acoustic signals in the moving fluid stream;

a rigid porous, acoustically transparent screen supported in a wall of said housing between the moving fluid steam and said at least one sensor and having a major surface disposed so as to be tangent to the fluid steam so that the moving fluid stream flows thereacross.

2. An assembly as claimed in claim 1, further comprising a layer of reduced velocity fluid separating the at least one sensor from said porous screen.

3. An assembly as claimed in claim 1, wherein said reduced velocity fluid comprises substantially still air.

4. An assembly as claimed in claim 1, wherein said housing comprises an elongate housing including a streamlined fairing at one end thereof for providing smooth flow of the fluid stream over said screen, said screen being supported in a side wall of said elongate housing and said at least one sensor being mounted on the housing within the side wall.

5. An assembly as claimed in claim 1, wherein said housing comprises a streamlined structure which protrudes into said fluid stream and which includes a top wall, said screen being supported on said top wall.

6. An assembly as claimed in claim 1, further comprising means for attenuating acoustic signals arriving at the assembly from other than a predetermined range of incident angles.

7. An assembly as claimed in claim 6, wherein a space is defined between the porous screen and the at least one sensor and said attenuating means comprises an absorbing material disposed in said space and including an aperture therein positioned over the at least one sensor and extending between the at least one aperture and said porous screen.

8. An assembly as claimed in claim 7, wherein said aperture is conical in shape.

9. An acoustic sensor assembly for sensing acoustic signals in a moving fluid, said assembly comprising:

a housing, at least one acoustic pressure sensor located within said housing for sensing acoustic signals in the moving fluid;

a rigid, porous, acoustically transparent screen supported in a wall of said housing between the moving fluid and the sensor in spaced relation to said at least one sensor so as to define a space between said screen and said at least one sensor, said screen having a major surface disposed so as that the moving fluid flows across said surface; and a layer of reduced velocity fluid located in said housing in said space and separating the at least one sensor from said porous screen.

10. An assembly as claimed in claim 9, wherein said screen is supported in a wall and said at least one sensor is mounted within the wall.

11. An assembly as claimed in claim 9, wherein said screen is supported in a streamlined structure which protrudes into said high speed fluid stream.

12. An assembly as claimed in claim 9, further comprising means for attenuating acoustic signals arriving at the assembly from other than a predetermined range of incident angles.

13. An assembly as claimed in claim 12, wherein said attenuating means comprises a sound absorbing material disposed in said space and including an aperture therein positioned over the at least one sensor and extending between the at least one aperture and said porous screen.

14. An assembly as claimed in claim 13, wherein said aperture is conical in shape.

15. An acoustic sensor assembly for sensing acoustic signals in a fluid stream, said assembly comprising:

a housing;

at least one acoustic pressure sensor located within said housing for sensing acoustic signals in said fluid screen;

a rigid, porous, acoustically transparent screen supported in a wall of said housing between the fluid stream and the sensor in spaced relation to said at least one sensor and having a major surface disposed so that the fluid stream flows across said surface; and means disposed between the screen and said at least one sensor for attenuating acoustic signals arriving at the assembly from other than a predetermined range of incident angles.

16. An assembly as claimed in claim 15, wherein a layer of reduced velocity fluid separates the at least one sensor from said porous screen.

17. An assembly as claimed in claim 16, wherein said reduced velocity fluid comprises substantially still air.

18. An assembly as claimed in claim 15, wherein said screen is supported in a side wall of said housing and said at least one sensor is mounted within the side wall.

19. An assembly as claimed in claim 15, wherein said housing comprises a streamlined structure which protrudes into the fluid stream.

20. An assembly as claimed in claim 15, wherein said attenuating means comprises a sound absorbing material disposed between said screen and said at least one sensor, said sound absorbing material including an aperture therein positioned over the at least one sensor and extending between the screen and the at least one sensor.

* * * * *